US007917131B2

(12) United States Patent  (10) Patent No.: US 7,917,131 B2
Feeney et al.  (45) Date of Patent: Mar. 29, 2011

(54) SYSTEM AND METHOD FOR MINIMIZING UNDESIRED AUDIO IN A COMMUNICATION SYSTEM UTILIZING DISTRIBUTED SIGNALING

(75) Inventors: Gregory A. Feeney, Chicago, IL (US); Marc W. Cassidy, Fox River Grove, IL (US); Gary P. Hunsberger, Schaumburg, IL (US); Daniel J. McDonald, Cary, IL (US); Michael C. Petrie, Hoffman Estates, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 859 days.

(21) Appl. No.: 11/858,434

(22) Filed: Sep. 20, 2007

(65) Prior Publication Data

US 2009/0081997 A1  Mar. 26, 2009

(51) Int. Cl.
*H04W 4/10* (2009.01)
(52) U.S. Cl. ........................................ 455/417; 370/347
(58) Field of Classification Search .................. 455/417; 370/347
See application file for complete search history.

(56) References Cited

U.S. PATENT DOCUMENTS

2005/0143056 A1  6/2005  Iyer
2006/0040687 A1  2/2006  Yoon
2007/0183372 A1  8/2007  Janko

FOREIGN PATENT DOCUMENTS

WO   WO2005009066 A   1/2005

OTHER PUBLICATIONS

TIA Standard, Project 25, FDMA—Common Air Interface, New Technology Standards Project—Digital Radio Technical Standards; TIA-102.BAAA-A203, Sep. 2003.
PCT Search Report Dated Feb. 23, 2009.
TIA Standard, Project 25, FDMA—Common Air Interface, New Technology Standards Project—Digital Radio Technical Standards; TIA-102.B111-1, Sep. 2003.

*Primary Examiner* — Jinsong Hu
*Assistant Examiner* — Nathan Taylor
(74) *Attorney, Agent, or Firm* — Terri S. Hughes; Valerie M. Davis

(57) ABSTRACT

A system and method for processing calls in a communication system utilizing distributed signaling. When a call signal having distributed identification data is received on a communication channel, the call information (such a voice, data, video, etc.) is initially passed through the system without verification until sufficient identification data (such as the color code) has been obtained to determine whether the source of the call is valid. Once sufficient identification data has been obtained, the source is verified. If the source is valid, the call information continues to be passed through the system. However, if source is invalid, the call information is blocked for the present call as well as for subsequent calls on the same communication channel, and passing of the call information through the system does not resume until a received call is subsequently assessed to be valid.

18 Claims, 5 Drawing Sheets

SYSTEM AND METHOD FOR MINIMIZING UNDESIRED AUDIO IN A COMMUNICATION SYSTEM UTILIZING DISTRIBUTED SIGNALING

TECHNICAL FIELD OF THE DISCLOSURE

This disclosure relates generally to data communications, and more particularly, to a system and method for minimizing undesired audio in a communication system utilizing distributed signaling.

BACKGROUND OF THE DISCLOSURE

Communication systems typically include a plurality of dispatch consoles and communication units, such as mobile or portable radio units, that are geographically distributed among various base sites and console sites. The communication units wirelessly communicate with the base sites and each other, and are often logically divided into various talkgroups. Communication systems may be organized as trunked systems, where a plurality of radio frequency (RF) communication resources are allocated amongst multiple users or groups by assigning the base sites and RF channels within a coverage area on a call-by-call basis, or as conventional (non-trunked) systems where RF communication resources are dedicated to one or more users or groups. In trunked systems, or in mixed trunked and conventional systems, there is usually provided a central controller/server (sometimes called a "zone controller") for allocating RF communication resources among a group of sites. The zone controller may reside within a single device or multiple devices and may be located at a fixed equipment site or may be distributed among the base sites.

Calls among the communication units are typically of the dispatch type, or better known as push-to-talk (PTT). Each time a communication unit is keyed to begin a call, the call is assigned to an available wireless channel. The originating communication unit begins transmitting on the assigned channel and continues to transmit on the assigned channel until the communication unit has been dekeyed by the user. Other communication units in an associated talkgroup also switch to the assigned channel and begin listening to the call.

To ensure that communications units are utilizing the correct channel, a network access code is also assigned (either statically or dynamically) for each channel. The network access code is encoded and transmitted along with the voice audio information. The network access code is often referred to as a color code. Each base site is then typically configured to validate the color code before broadcasting the call to other communication units to ensure that the source of the incoming call is transmitting on the correct channel. Each receiving communication unit is typically also configured to receive and validate the color code for each call.

One set of industry standards commonly used for communication systems is referred to as Project 25, developed by the Association of Public Communications Officials (APCO). Currently deployed Project 25 systems, generally referred to as Phase 1 systems, utilize Frequency Division Multiple Access (FDMA) modulation for transmitting call information. In such systems, the color code is typically transmitted in one continuous data block prior to the start of voice audio information blocks. As such, the color code can be acquired and validated quickly in a single step. This operation, however, cannot be utilized in a Time Division Multiple Access (TDMA) solution in which the color code must be distributed across multiple TDMA bursts since the color code cannot be properly validated in a single step. Thus, validating a distributed color code in a single burst, as required in a TDMA solution, could result in audio that was improperly validated causing possible audio anomalies, such as incorrectly muted audio.

BRIEF DESCRIPTION OF THE FIGURES

Various embodiment of the disclosure are now described, by way of example only, with reference to the accompanying figures.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve the understanding of various embodiments of the present disclosure. Also, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION OF THE DISCLOSURE

The present disclosure provides a system and method for processing calls in a communication system utilizing distributed signaling. For purposes of this disclosure, distributed signaling should be understood to mean that information transmitted during a call is distributed among various data blocks. In accordance with the present disclosure, when a call signal having distributed identification data is received on a communication channel, the call information (such a voice, data, video, etc.) is initially passed through the system without verification until sufficient identification data (such as the color code) has been obtained to determine whether the source of the call is valid. Once sufficient identification data has been obtained, the source is verified. If the source is valid, the call information continues to be passed through the system. However, if source is invalid, the call information is blocked for the present call as well as for subsequent calls on the same communication channel, and passing of the call information through the system does not resume until a received call is subsequently assessed to be valid.

Figure 1:
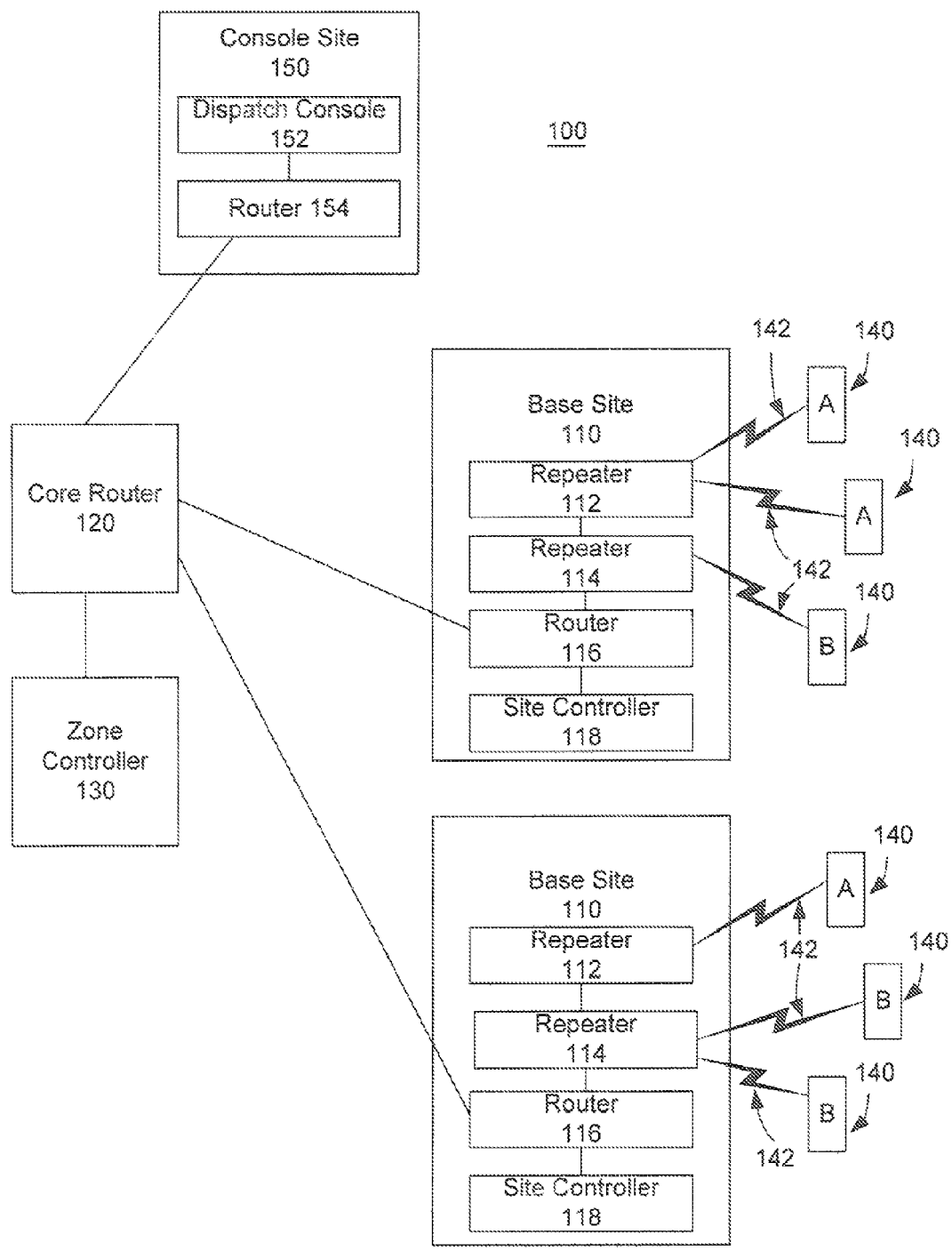
FIG. 1 shows one embodiment of a communication system in accordance with the present disclosure.

Let us now discuss the present disclosure in greater detail by referring to the figures below. FIG. 1 shows one embodiment of a single-zone in a communication system 100. The system 100 comprises a plurality of base sites 110 that are in communication with a core router 120. The core router 120 is also coupled to a zone controller 130. The zone controller 130 manages and assigns Internet Protocol (IP) multicast addresses for payload (voice, data, video, etc.) and control messages between and among the various base sites 110. The zone controller 130 is also responsible for assigning communication channels at the base sites 110.

As depicted in FIG. 1, each base site 110 comprises a plurality of repeaters 112, 114 that are coupled, for example via Ethernet, to an associated router 116, which is in turn coupled to the core router 120. Of course, while each base site 110 is illustrated as having two repeaters 112, 114, it is understood that any number of repeaters may be provided at each base site 110. Each router 116 is also coupled to a site controller 118. The site controller 118 is configured to handle communication channel assignments for its respective base site 110 in the event the base site 110 is unable to communicate with the zone controller 130

The repeaters 112, 114 at each base site 110 communicate using wireless communication resources 142 with communication units 140 within a specific coverage area. The wireless communication resources 142 may comprise any type of communication resource such as, for example, RF technologies, including, but not limited to FDMA, TDMA, Code Division Multiple Access (CDMA), Orthogonal Frequency Division Multiple Access (OFDMA), and the like. Other wireless technologies, such as those now known or later to be developed and including, but not limited to, infrared, Bluetooth, electric field, electromagnetic, or electrostatic transmissions, may also offer suitable substitutes.

The communication units 140 may be mobile or portable wireless radio units, cellular radio/telephones, video terminals, portable computers with wireless modems, or any other wireless devices. The communication units 140 may also be arranged into talkgroups having corresponding talkgroup identifications as known in the art. In FIG. 1, two separate talkgroups are illustrated, identified by labels "A" and "B." Of course, any number of talkgroups having corresponding talkgroup identifications may be established within the system 100.

The core router 120 may also be further coupled to a console site 150. The console site 150 includes at least one dispatch console 152 that is coupled, for example via Ethernet, to a router 154, which is in turn coupled to the core router 120. Console sites 150 can affiliate with either or both talkgroups "A" and "B" and, accordingly, may be considered members of both talkgroups "A" and "B." Although not shown in FIG. 1, it will be appreciated that a single site may include both repeaters and dispatch consoles. In one embodiment, the base sites 110, the core router 120, the zone controller 130 and the dispatch site 150 may be coupled using T1 lines, E1 lines, fiber optic lines, wireless links, Ethernet links, or any other suitable means for transporting data between the various components.

Practitioners skilled in the art will appreciate that the system 100 may also include various other elements not shown in FIG. 1. For example, although only two base sites 110 and one console site 150 are illustrate in FIG. 1, the system may include any number of base sites 110 or console sites 150. The system 100 may include remote sites configured to provide simulcast transmissions. The system 100 may also include multiple interconnected zones, each containing a zone controller 130, base sites 110, and console sites 150. The system 100 may also be linked to a public switched telephone network (PSTN), a paging network, or a facsimile machine. The communication system 100 may also be connected to a number of additional content sources, such as the Internet or various Intranets.

Figure 2:
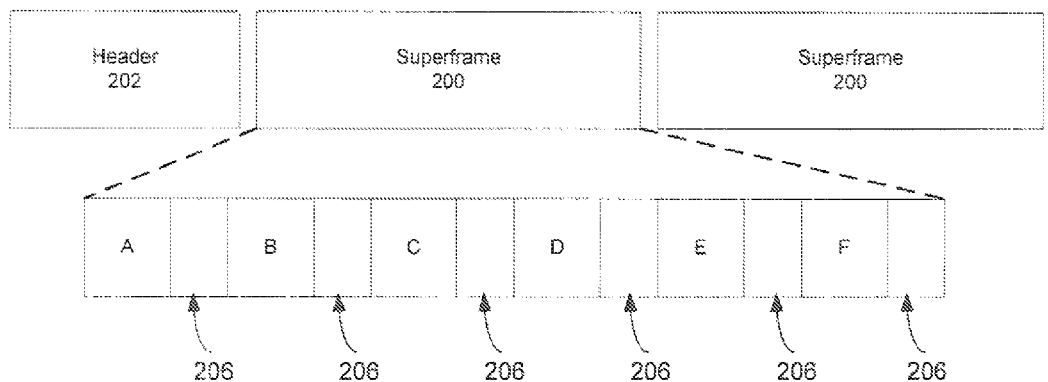
FIG. 2 shows one embodiment of a TDMA signal in accordance with the present disclosure.

FIG. 2 illustrates one embodiment of a communication protocol for transmitting a call signal in the system of FIG. 1. In this embodiment, the call signal is transmitted as a TDMA signal. The TDMA signal is separated into multiple superframes 200. Each superframe 200 includes six individual bursts A, B, C, D, E, and F, each of which is 264 bits in length and 27.5 ms in duration. Sub-slots 206 are also provided between individual bursts. These sub-slots 206 may include a Common Announcement Channel for outgoing calls, or guard bands in the case of incoming calls. Every 360 ms during a call, this superframe burst sequence is repeated.

Each call may also begin with a header 202. The header 202 may include a link control header burst, which may contain information such as a manufacturer ID, a talkgroup ID, a source ID, and a destination ID. The header 202 may also have an encryption synchronization header burst if the voice transmission is encrypted. The encryption synchronization header burst may include information such as a message indicator, an encryption algorithm ID, and an encryption key ID.

Figure 3:
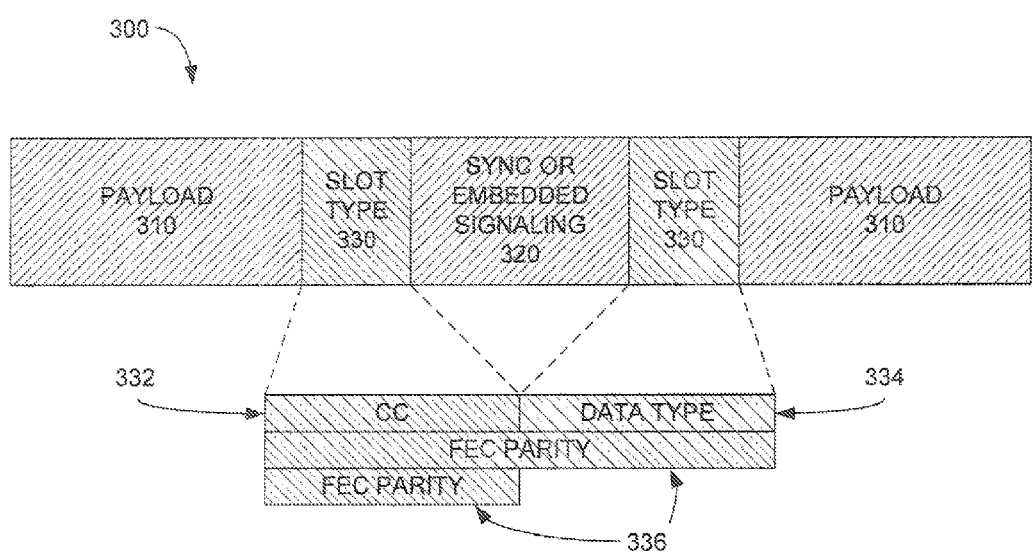
FIG. 3 shows one embodiment of a TDMA burst in accordance with the present disclosure.

FIG. 3 illustrates one exemplary embodiment of an individual TDMA burst. As shown, each TDMA burst 300 comprises a payload field 310 containing 196 bits of information. The payload field 310 includes forward error correction (FEC) encoded information specific to the type of burst being transmitted. For example, when transmitting voice call information, the payload field 310 in bursts A-F corresponds to 60 ms of voice information. However, the payload field 310 may also include data, video, or information for any other type of communication format.

The center of the TDMA burst also includes a synchronization pattern or embedded signaling information field 320. Generally, the first burst in each superframe (e.g., the A burst) includes a 48-bit voice frame synchronization in the center of the burst to indicate the beginning of a superframe. Bursts B through F do not include a voice frame synchronization pattern, but instead substitute either Link Control information or Key ID information in the middle of the burst.

The TDMA burst also includes a 20-bit slot type field 330 having information that defines the meaning of the payload field 310. In one embodiment, the slot type field 330 comprises a color code (CC) field 332, a data type field 334, and FEC parity 336.

As would be understood by one skilled in the art, the CC field 332 includes encoded information representing at least a portion of a network access code (NAC) that is used to validate whether a communication unit is transmitting or receiving on the appropriate channel and/or TDMA time slot. In one embodiment, the NAC may be a 12-bit code word that is utilized for both FDMA transmissions (which are used for communicating with legacy APCO Project 25 Phase 1 systems) and TDMA transmissions.

Figure 4:
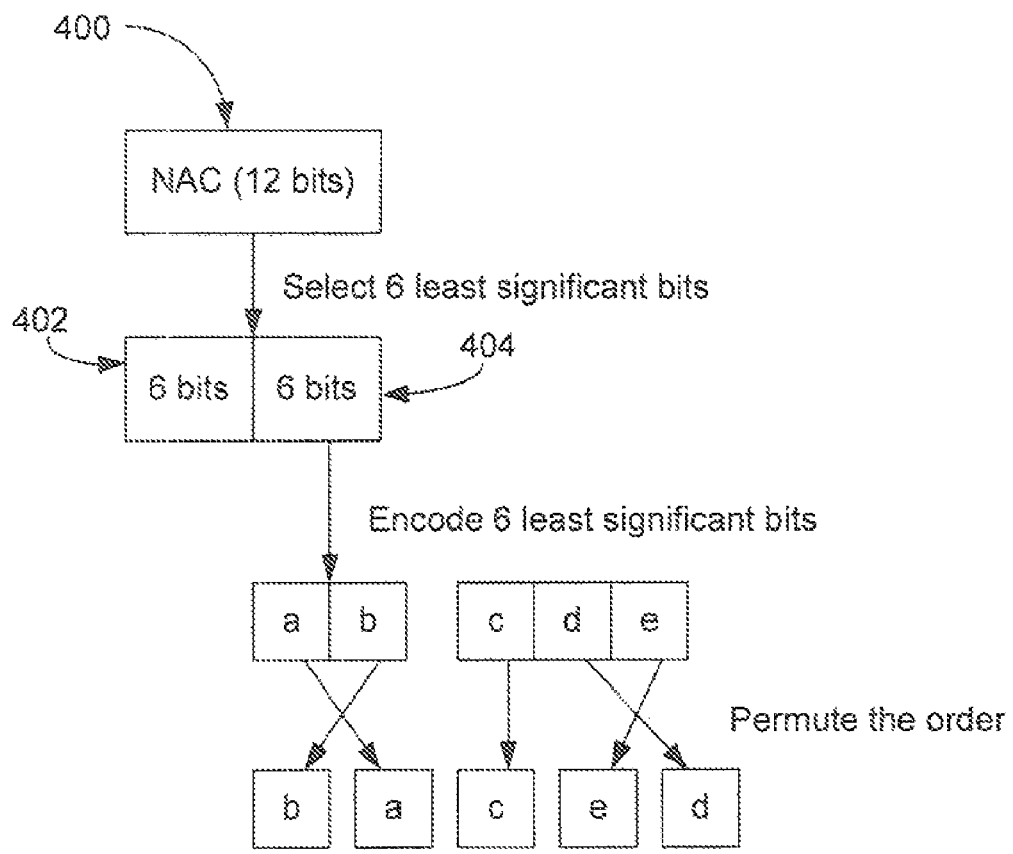
FIG. 4 shows one embodiment of a method for encoding a color code in accordance with the present disclosure.

One exemplary process for encoding the NAC for use in TDMA communications is illustrated in FIG. 4. In this embodiment, only the six least significant bits 404 of the NAC 400 are selected for encoding, while the six most significant bits 402 are not utilized (as opposed to FDMA transmissions which utilize all twelve bits of the NAC). The six least significant bits 404 are separated into two tri-bits and each of the tri-bits is encoded using a (5,2,4) Reed-Solomon Code to form five encoded CC tri-bits (a-e). The resulting five CC tri-bits a-e are permuted in the order {b, a, c, e, d}.

The permuted CC tri-bits are inserted into the CC fields 332 of the individual TDMA bursts 300, with one CC tri-bit per burst. More particularly, in accordance with the present disclosure, the permuted CC tri-bits are consecutively inserted within each transmitted burst (such as a header burst or any one of bursts B-F), except for the A burst of a superframe.

Of course, while one specific embodiment of a call signal, an associated superframe structure, and an encoding process is described, those skilled in the art will readily understand that other structures may be used for the call signal and the superframe, and other processes may be used for performing the color code encoding. For example, although the standards have not been finalized, the present disclosure may potentially be applicable for use in conjunction with APCO Project 25 Phase 2 TDMA systems so long as such systems utilize distributed information to perform validation or identification (which may or may not be a color code). Additionally, the call signal need not be a TDMA signal, but may use any type of modulation scheme that employs distributed signaling.

Figure 5:
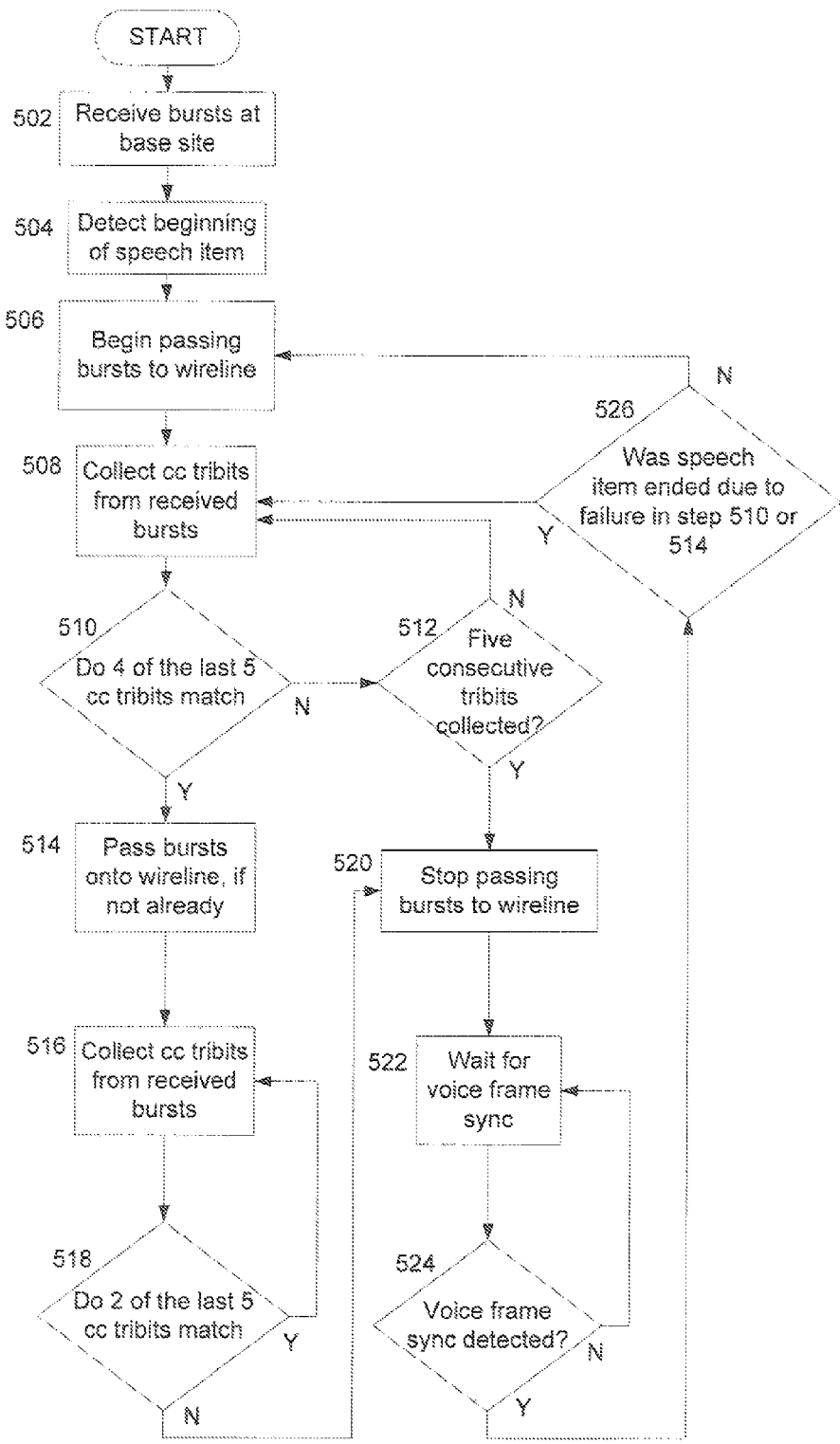
FIG. 5 shows one embodiment of a method for receiving a call at a base site in accordance with the present disclosure.
Figure 6:
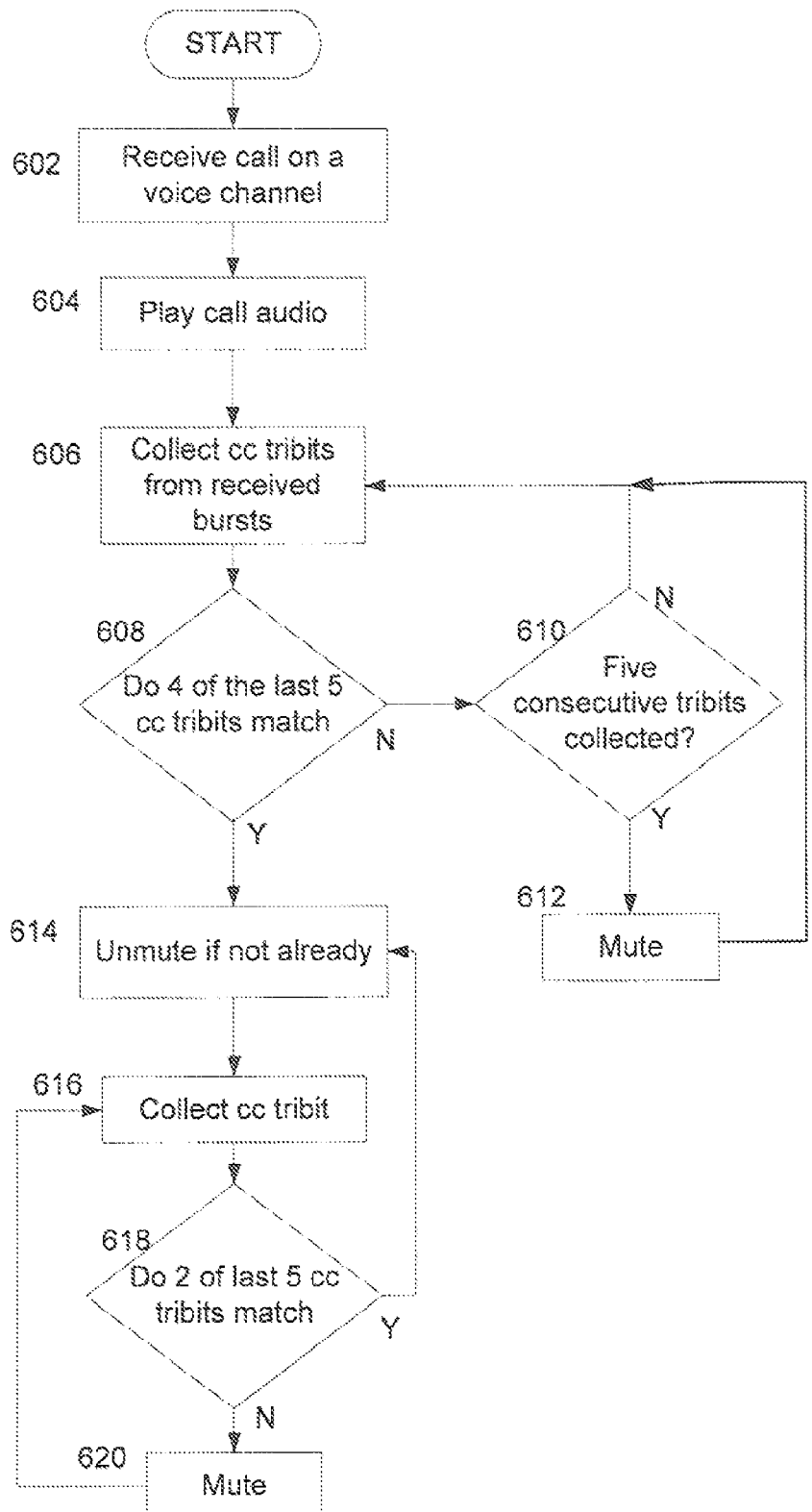
FIG. 6 shows one embodiment of a method for receiving a call at a communication unit in accordance with the present disclosure.

FIGS. 5 and 6 illustrate two exemplary embodiments for receiving audio calls utilizing distributed signaling in accordance with the present disclosure. Of course, it will be understood that the present disclosure is similarly applicable to video, data or other types of communications.

Turning first to FIG. 5, one embodiment of a method for processing incoming audio calls at a base site 110 is described. In step 502, an incoming call is received at a base site 110 via a communication channel. The incoming call may be from any source such as a communication unit 140, a base site 150, etc. In step 504, the base site 110 detects the beginning of a speech item (i.e., the beginning of an audio call), for example, by detecting a link control header burst or a voice frame synchronization pattern. After detecting the beginning of the speech item, the base site 110 begins passing the received incoming TDMA bursts to the appropriate components of the communication system 100 in order to broadcast the call to the proper communication units 140 (also referred to in the art as "passing the incoming TDMA bursts to the wireline") in step 506.

The base site 110 collects the CC tri-bits embedded within the incoming TDMA bursts in step 508, and determines whether a predetermined portion of the last X number of collected CC tri-bits are a match in step 510. For purposes of this discussion, let us assume that the system is configured to use the call signal structure described in FIGS. 2 and 3 above. In this instance, the base site 110 may be configured to store the CC tri-bits from at least the last five received TDMA bursts (excluding the A burst which does not contain CC tri-bits). The base site 110 may then compare the last five collected CC tri-bits with an expected CC tri-bit sequence. In one embodiment in accordance with the present disclosure, a match is declared if at least four of the last five collected CC-tri-bits are a match to the CC tri-bits from the expected sequence. Specific methods and processes for determining how to match to a rotating pattern of tri-bit symbols are well known in the art and are therefore not discussed in further detail herein.

Of course, if the color code information is encoded into a different number of CC tri-bits, the base site 110 may be configured to store a different number of the last received CC tri-bits. The threshold for declaring a match may also be altered based on the requirements of a particular system. For example, in another embodiment, a match may be declared only if all five of the last received CC tri-bits match, or alternatively if less than four of the last five received CC tri-bits match.

If no match is declared in step 506, the process proceeds to step 512 where it is determined whether five consecutive CC tri-bits have been collected for the current speech item. If not, the process returns to step 508 and the base site 110 continues to collect CC tri-bits. This ensures that the base site 110 has collected sufficient CC tri-bits from the current speech item to determine whether there is a match. If five consecutive CC tri-bits have been collected, the process proceeds to step 522, which will be described below.

If at least four of the last five received CC tri-bits are found to be a match in step 510, the base site 110 begins passing TDMA bursts to the wireline in step 514, if it was not already doing so. If the base site 110 was not already passing the TDMA bursts, the base site 110 may also transmit a start signal to indicate that a speech item is about to be transmitted. The base site 110 continues collecting CC tri-bits from incoming TDMA bursts in step 516 and again compares the received CC tri-bits to the expected CC tri-bit sequence to determine if there is a match in step 518. However, since the source of the incoming call has already been validated in step 510, the base site 110 may use a looser algorithm in step 518 to limit the risk of prematurely stopping a valid call, for example due to a short fade. For instance, as shown in FIG. 5, the base site 110 may be configured to declare a match in step 518 if at least two of the last five received CC tri-bits are a match to the expected CC tri-bit sequence. Of course, different thresholds may be used and the threshold used for step 518 need not be different from the threshold used for step 510.

If four of the last five received CC tri-bits were not found to be a match in step 510, or if at least two of the last five received CC tri-bits were not found to be a match in step 518, the base site 110 ceases passing incoming TDMA bursts to the wireline in step 520, which stops the call information from being broadcast. Instead the base site 110 may pass blank TDMA bursts (also called erasure bursts) to be broadcast to the appropriate communication units 140. The blank TDMA bursts are recognized as such by the receiving communications unit 140 and are not played as audio. Upon ceasing to pass the incoming TDMA bursts to the wireline, the base site 110 may also transmit a stop message indicating that the current speech item has been ended abnormally due to an improper color code. In one embodiment, this message may be in the form of an ABSTOP signal.

In step 522, the base site 110 monitors the incoming signal for a voice frame synchronization pattern, and continues to do so until a voice frame synchronization pattern is detected in step 524, in which case the process proceeds to step 526. In one embodiment, the base site 110 may be configured to initially monitor only the times when a voice frame synchronization pattern is expected to be received (i.e., when an A burst is expected), and then, if no voice frame synchronization pattern is detected after a predetermined amount of time, monitor all the incoming bursts for a voice frame synchronization pattern. Of course, the base site 110 may also be configured to always monitor only the times when a voice frame synchronization pattern is expected, or to always monitor all the incoming bursts for a voice frame synchronization pattern.

In step 526, the reason why the base site 110 stopped passing incoming TDMA bursts to the wireline in step 520 is determined. If it was due to a failure to match four out of five CC tri-bits in step 510, the base site continues not to pass the TDMA bursts to the wireline and the process proceeds to step 508. If the base site 110 stopped passing incoming TDMA bursts to the wireline due to a failure to match two of the last five received CC tri-bits in step 518, the process proceeds to step 506, where the base site 110 begins to pass the incoming bursts to the TDMA wireline. Thus, for failures to match occurring in step 518, the base site 110 allows the call information to be broadcast again as soon as a voice frame synchronization pattern is detected while, for failures to match in step 510, the base site 110 does not permit the call information to be broadcast until a match is found in step 510. This process continues to be repeated continuously or periodically so long as the base site 110 is receiving call information on the same communication channel.

FIG. 6 illustrates an exemplary embodiment for receiving incoming calls at a communication unit 140 in accordance with the present disclosure. In step 602, a communication unit 140 receives a call in a TDMA format on a communication channel. The communication unit 140 begins playing the audio for the call in step 604 and collects CC tri-bits from the received TDMA bursts in step 606.

In step 608, the communication unit 140 determines whether a predetermined portion of the last X number of collected CC tri-bits are a match. As in the embodiment described in FIG. 5, this may involve determining whether at least four of the last five collected CC-tri-bits are a match to the CC tri-bits from the expected sequence. Of course, the number of CC tri-bits compared and the threshold for declaring a match may be altered based on the standards and requirements for a particular system.

If no match is declared in step 608, the process proceeds to step 610 where it is determined whether five consecutive CC tri-bits have been collected. If not, the process returns to step 606 and the base site 110 continues to collect CC tri-bits. As with the embodiment in FIG. 5, this ensures that the base site 110 has collected sufficient CC tri-bits from the current speech item to determine whether there is a match. If five consecutive CC tri-bits have been collected, the audio from the call is muted in step 610 and the process returns to step 606.

If at least four of the last five received CC tri-bits are found to be a match in step 608, the audio for the call is unmuted in step 614, if it is not already. The communication unit 140 continues to collect CC tri-bits from received TDMA bursts in step 616 and again compares the received CC tri-bits to the expected CC tri-bit sequence to determine if there is a match in step 618. As in the embodiment of FIG. 5, since the incoming source has already been validated in step 608, the communication unit 140 may use a looser algorithm in step 618. For instance, as shown in FIG. 6, the communication unit 140 may be configured to declare a match in step 618 if at least two of the last five received CC tri-bits are a match to the expected CC tri-bit sequence. Of course, different thresholds may be used and the threshold used for step 618 need not be different from the threshold used for step 608.

If the communication unit 140 determines that at least two of the last five received CC tri-bits match in step 618, the process returns to step 614 and to begin playing audio for the call, if the communication unit 140 is not already doing so. If the communication unit 140 determines that at least two of the last five received CC tri-bits do not match in step 618, the call is muted in step 620. This process is repeated continuously or periodically so long as the communication unit 140 is receiving on the same communication channel.

By means of the aforementioned disclosure, a system and method is provided for limiting the presence of undesired call information from being passed through a communication system while simultaneously preventing desired audio from being unnecessarily truncated.

Further advantages and modifications of the above described system and method will readily occur to those skilled in the art. For example, the above disclosure describes two exemplary embodiments for performing the present disclosure both at a base site 110 and at a communication unit 140. One of ordinary skill in the art would readily understand embodiments may be used separately, or in conjunction with one another. The present disclosure may also be used with any distributed signaling format, and for any type of call information (e.g., audio, video, data).

The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure cover all such modifications and variations provided they come within the scope of the following claims and their equivalents.

What is claimed is:

1. A method for processing call signals in a communication system comprising:
   receiving a call signal having distributed identification data, wherein the call signal is transmitted using TDMA modulation and is received from a source on a communication channel, wherein the distributed identification data comprises color code data that is distributed among a plurality of bits over a plurality of separate TDMA bursts;
   obtaining the distributed identification data to determine whether the source is valid;
   permitting call information derived from the call signal to be played at a communication unit until sufficient distributed identification data has been obtained to determine whether the source is valid; and
   after obtaining sufficient distributed identification data to determine whether the source is valid,
   (a) determining whether the source is valid based on the distributed identification data;
   (b) permitting call information received on the communication channel to be played at the communication unit if the source is determined to be valid;
   (c) preventing call information received on the communication channel from being played at the communication unit if the source is determined to be invalid; and
   (d) repeating steps (a) through (c) so long as the device continues to receive a call signal on the communication channel.

2. The method of claim, 1 wherein the color code data is distributed among a plurality of color code tri-bits, each of the plurality of color code tri-bits being transmitted within a separate TDMA burst.

3. The method of claim 2 wherein the step of determining whether the source is valid includes determining whether an x number of the last y color code tri-bits received during the call signal are a match to an expected sequence of color code tri-bits; wherein y is a first integer and x is a second integer less than or equal to y.

4. The method of claim 3 wherein x is 4 and y is 5.

5. The method of claim 3 wherein determining whether at least 5 consecutive color code tri-bits have been collected.

6. The method of claim 3 wherein the call signal is received at a base site.

7. The method of claim 3 wherein the call signal is received at a communication unit.

8. The method of claim 6 wherein permitting call information to be played at the communication unit includes permitting call information received at the base site to be broadcast to the communication unit, and preventing call information from being played at the communication unit includes preventing call information received at the base site from being broadcast to the communication unit.

9. The method of claim 6 wherein, if the source is determined to be valid, the value of x is set to a third integer less than the second integer.

10. The method of claim 6 wherein, if the source is determined to be invalid, the method further includes:
   determining whether a synchronization signal has been detected; and
   broadcasting the call information to the communication unit if the synchronization signal has been detected.

11. The method of claim 7 wherein permitting call information to be played at the communication unit includes playing the call information on the communication unit and preventing call information from being played at the communication unit includes muting the communication unit.

12. The method of claim 7 wherein, if the source is determined to be valid, the value of x is set to a third integer less than the second integer.

13. The method of claim 9 wherein, if the source is determined to be invalid, the value of x is set to the value of the second integer.

14. A communication system comprising:
   a plurality of communication units; and
   a base site capable of receiving a call signal transmitted using TDMA modulation, the call signal having call information and distributed identification data from at least a first one of the plurality of communication units on a communication channel, wherein the distributed identification data comprises color code data that is distributed among a plurality of bits over a plurality of separate TDMA bursts; the base site being configured to obtain the distributed identification data to determine whether a source of the call signal is valid; and to permit call information to be broadcast to at least a second one of the communication units until sufficient distributed identification data has been obtained to determine whether the source is valid;
   wherein after determining that sufficient distributed identification data has been obtained to determine whether the source is valid; the base site is further configured to repeatedly determine whether the source is valid based on the distributed identification data; permit call information received on the communication channel to be broadcast to at least the second one of the plurality of communication units if the source is determined to be valid; and prevent call information received on the communication channel from being broadcast to at least the second one of the plurality of communication units if the source is determined to be invalid.

15. The communication system of claim 14 wherein each base site is configured to initially use a first set of criteria to determine whether the source is valid; and wherein, if the source is determined to be valid, the base site is configured to subsequently use a second set of criteria to determine whether the source is valid.

16. The communication system 14 wherein the color code data is distributed among a plurality of color code tri-bits, each of the plurality of color code tri-bits being transmitted within a separate TDMA burst; and wherein the base site is configured to determine whether the source is valid by determining whether an x number of the last y color code tri-bits received from the call signal are a match to an expected sequence of color code tri-bits; wherein y is a first integer and x is a second integer less than or equal to y.

17. A communication system comprising:
   a base site for broadcasting a call signal on a communication channel, wherein the call signal is transmitted using TDMA modulation, wherein the call signal having call information and distributed identification data, and wherein the distributed identification data comprises color code data that is distributed among a plurality of bits over a plurality of separate TDMA bursts; and
   a plurality of communication units; each of the plurality of communication units being capable of receiving the call signal from the base site; each of the plurality of communication units being configured to obtain distributed identification data to determine whether a source of the call signal is valid; and to permit the call information to be played at the communication unit until sufficient distributed identification data has been obtained to determine whether the source is valid; and
   wherein after determining that sufficient distributed identification data has been obtained to determine whether the source is valid; each of the plurality of communication units is further configured to repeatedly determine whether the source is valid based on the distributed identification data; permit call information received on the communication channel to be played if the source is determined to be a valid call signal; and mute the communication unit if the source is determined to be an invalid call signal.

18. The communication system of claim 17 wherein each of the plurality of communication units is configured to initially use a first set of criteria to determine whether the source is valid, and subsequent to initially determining that the source is valid, to use a second set of criteria to determine whether the source is valid.

* * * * *

UNITED STATES PATENT AND TRADEMARK OFFICE
CERTIFICATE OF CORRECTION

| | | |
|---|---|---|
| PATENT NO. | : 7,917,131 B2 | Page 1 of 1 |
| APPLICATION NO. | : 11/858434 | |
| DATED | : March 29, 2011 | |
| INVENTOR(S) | : Feeney et al. | |

It is certified that error appears in the above-identified patent and that said Letters Patent is hereby corrected as shown below:

In Column 8, Line 44, in Claim 2, delete "claim," and insert -- claim --, therefor.

In Column 10, Line 7, in Claim 16, delete "14" and insert -- of claim 14 --, therefor.

Signed and Sealed this
First Day of January, 2013

David J. Kappos
*Director of the United States Patent and Trademark Office*